Aug. 6, 1929.  B. A. TETZLAFF  1,723,259

CLAMP

Filed Feb. 27, 1928

Inventor
Benjamin A. Tetzlaff
by Frank Schraeder Jr.
Attorney

Patented Aug. 6, 1929.

1,723,259

UNITED STATES PATENT OFFICE.

BENJAMIN A. TETZLAFF, OF BERWYN, ILLINOIS.

CLAMP.

Application filed February 27, 1928. Serial No. 257,120.

This invention relates generally to certain new and useful improvements in clamps adapted for use in connection with tubular or cylindrical bodies, and more particularly adapted for securing together two of such bodies, as for example, securing a hose to a pipe. The invention is also adaptable for use as a ground connection clamp for electric circuits, such as radio and the like.

It is an object of my invention to provide a clamp which shall be simple in construction and low in cost of manufacture and which shall readily be adjustable for use on cylindrical or tubular members of varying diameters.

Another object of my invention is to provide a clamp which by virtue of its adjustability will obviate the necessity of a retailer carrying a stock of clamps of varying diameters or sizes.

With the above and other objects in view, my invention consists in the novel combination, construction and arrangement of the parts and members shown in the preferred embodiment in the attached drawings, described in the following specifications and particularly pointed out in the appended claims.

Referring to the illustrations, Fig. 1, is a side elevation of my improved clamp as applied to securing together a pair of cylindrical members.

Referring to the illustrations in detail, 10 indicates a strip of flexible metallic material having a plurality of openings $10^A$ in one end thereof.

Figure 1:
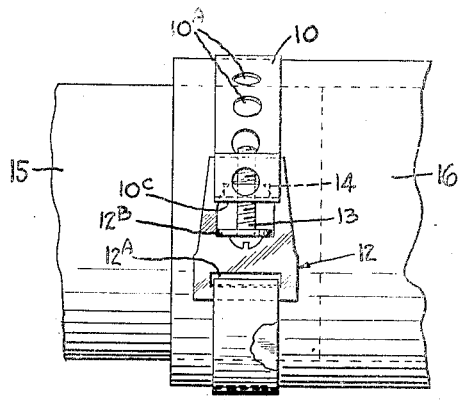
Figure 2:
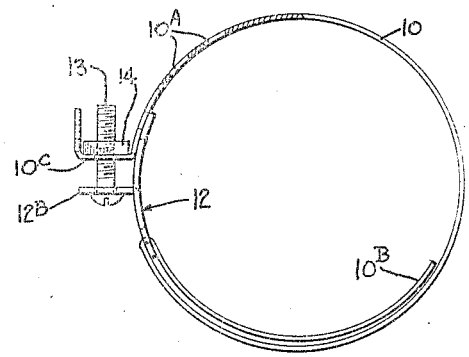
Fig. 2, is an end elevation of the clamp.
Figure 3:
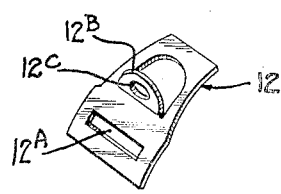
Fig. 3, is a perspective view of a connection employed at one end of the clamp for supporting a screw or bolt.
Figure 4:
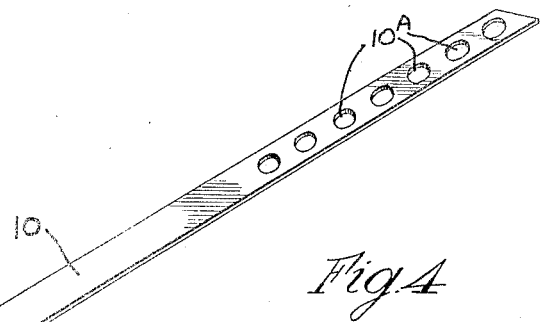
Fig. 4, is a developed view of the clamp band.
Figure 5:
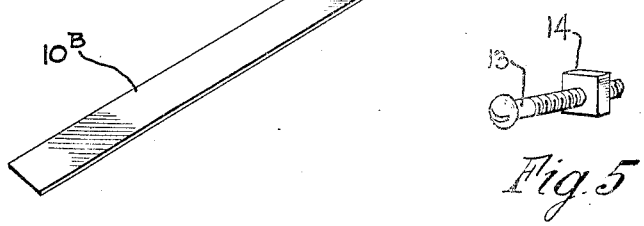
Fig. 5, is a perspective view of a screw and nut for tightening the clamp.

A separate connection 12 is provided having a slight arcuate formation lengthwise thereof. The connection 12 is formed with a transverse slot $12^A$ and with an upstanding lug $12^B$ punched out of the body thereof, as clearly shown in Fig. 3. The lug $12^B$ is provided with an opening $12^C$.

A tightening screw 13 and nut 14 are provided for tightening of the clamp.

To secure the clamp into operative position, the unperforated end $10^B$ of the strip 10, is passed through the slot $12^A$ of the connection 12 and the end $10^B$ is then folded over to lie on the inner face of the circular band; the fold occuring at a point to allow sufficient length at the other end of the band for a right-angularly bent wall $10^C$ against which the nut 14 may be held while the screw or bolt 13 is passed through the opening $12^C$ in the lug $12^B$ and thence through one of the openings $10^A$ which registers with the opening $12^C$ and thence into the nut 14. The threading of the screw or bolt 13 into the nut 14 will draw the connection 12 and end wall $10^C$ together to thus tighten the clamp around the cylindrical members 15 and 16.

I claim:—

1. An adjustable clamp comprising a band of flexible material, a separate connection having a perforated lug and a cross slot, said lug being formed integrally with said connection and being formed from an intermediate portion of the body of such connection, one end of said material being passed through said cross slot and bent over itself and the other end of said material having an opening therein and being bent between said opening and its other end to form an angularly disposed wall, a nut held against said wall, and a tightening screw or bolt extending through said perforated lug and through said wall opening into said nut, whereby the clamp may be securely tightened.

2. An adjustable clamp comprising a band of flexible material, a separate connection having a perforated integral lug and a cross slot, said lug being formed from an intermediate portion of the body of such connection, one end of said material being passed through said cross slot and bent over itself and the other end of said material having an opening therein and being bent between said opening and its other end to form an angularly disposed wall, a nut held against said wall, and a tightening screw or bolt extending through said perforated integral lug and through said wall opening into said nut, whereby the clamp may be securely tightened.

3. An adjustable clamp comprising a band of flexible material, a separate connection having a perforated integral lug and a cross slot, said lug being formed from an intermediate portion of the body of such connection, one end of said material being passed through said cross slot and bent over itself and the other end of said material having a plurality of openings therein and being bent between said opening and its other end to form an angularly disposed wall, a nut held against said wall, and a tightening screw or bolt extending through said perforated integral lug and through said wall opening into said nut, whereby the clamp may be securely tightened.

In witness whereof I affix my signature.

BENJAMIN A. TETZLAFF.